United States Patent
Stahler, Sr.

(10) Patent No.: US 6,234,497 B1
(45) Date of Patent: May 22, 2001

(54) HAND TRUCK HAVING A FOLDING NOSE PIECE

(75) Inventor: Richard D. Stahler, Sr., Mantua, NJ (US)

(73) Assignee: Wesco Industrial Products, Inc., Lansdale, PA (US)

(*) Notice: Subject to any disclaimer, the term of this patent is extended or adjusted under 35 U.S.C. 154(b) by 0 days.

(21) Appl. No.: 09/349,751

(22) Filed: Jul. 8, 1999

(51) Int. Cl.$^7$ ............................................. B62B 1/12
(52) U.S. Cl. ................................. 280/47.29; 403/103
(58) Field of Search ......................... 403/78, 79, 84, 403/85, 103, 104; 280/47.29, 47.27, 47.28, 47.24

(56) References Cited

U.S. PATENT DOCUMENTS

| | | |
|---|---|---|
| D. 328,661 | 8/1992 | vom Braucke et al. . |
| 1,484,864 * | 2/1924 | Bompart ........................... 280/47.29 |
| 3,043,603 | 7/1962 | Major, Sr. . |
| 3,121,963 | 2/1964 | Nolan . |
| 3,241,852 | 3/1966 | Muller et al. . |
| 3,362,725 * | 1/1968 | Dolphin ............................... 403/84 |
| 3,647,238 * | 3/1972 | Mackey ............................. 280/47.29 |
| 3,827,707 | 8/1974 | Bierman . |
| 3,960,252 | 6/1976 | Cassimally . |
| 4,185,853 | 1/1980 | Thurmond, Jr. . |
| 4,335,895 | 6/1982 | Walker . |
| 4,401,319 | 8/1983 | Kazmark . |
| 4,448,434 | 5/1984 | Anderson . |
| 4,523,773 | 6/1985 | Holtz . |
| 4,563,014 | 1/1986 | Mortenson . |
| 4,637,626 | 1/1987 | Foss et al. . |
| 4,754,985 | 7/1988 | Im et al. . |
| 4,974,862 * | 12/1990 | Maupin ........................ 280/47.29 X |
| 4,993,727 | 2/1991 | vom Braucke et al. . |
| 5,024,458 * | 6/1991 | Kazmark et al. ............. 280/47.29 X |
| 5,439,239 | 8/1995 | Su . |

FOREIGN PATENT DOCUMENTS 297 14 225 U  9/1997  (DE) .

* cited by examiner

*Primary Examiner*—Michael Mar
(74) *Attorney, Agent, or Firm*—Akin, Gump, Strauss, Hauer & Feld, L.L.P.

(57) ABSTRACT

A hand truck with a folding nose piece that uses an efficient mechanism to secure the nose piece in either one of a first position, ideal for the transportation of items, and a second position, ideal for storage of the hand truck. The hand truck includes a frame having a pair of wheels over which the center of gravity of items is aligned during transport. A nose piece is rotatably attached to the frame and is rotatable between a first position, generally perpendicularly extended from the frame, and a second position, generally parallel to the frame. A lever pivotally connected to the frame moves between a locked position and an open position. The lever engages and maintains the nose piece in the first position when the lever is in the locked position. The lever also engages and maintains the nose piece in the second position when the lever is in the locked position. The nose piece is movable between the first position and the second position when the lever is in the open position.

4 Claims, 5 Drawing Sheets

HAND TRUCK HAVING A FOLDING NOSE PIECE

BACKGROUND OF THE INVENTION

The present invention relates to a hand truck and, more specifically, to a hand truck having a folding nose piece.

Many devices have been developed over the years to aid people in the movement and transportation of items that otherwise would be too heavy or unwieldy to move. There exist a multitude of powered devices such as cranes, forklifts, hydraulic ramps, and etc. that simplify moving. A similar variety of non-powered devices also exists for people to choose from. Non-powered devices, such as pulleys, ropes, clamps, levers, and hand trucks, are commonly available to consumers. The ease of use of the contemporary hand truck makes it an ideal tool for transporting heavy objects and has led to the common use of hand trucks by tremendous numbers of people.

The wide spread utilization of hand trucks has led to many manufacturers researching improvements in the design of the modern hand truck. Today, industrial quality hand trucks are produced that have a frame made of thicker members and tougher materials to simplify transporting appliances and other items that are too large for the smaller sized hand trucks.

One disadvantage to the contemporary hand truck is that the nose piece makes it difficult to store or to transport the hand truck. This has led to difficulties with transporting hand trucks in the trunk of a car or in the back of a tightly packed moving van. While some hand trucks have been designed that have rotating nose pieces, the designs are complicated and require the manufacture of a complicated structure that increases the costs incurred by the manufacturer and passed on to the consumer.

The present invention overcomes many of the drawbacks of the contemporary art by providing a hand truck with a foldable nose piece that has a rugged, efficient, and simplified design. This allows for the inventive hand truck to be easily stored in a closet or to be easily placed inside of a tightly packed moving truck. The sturdy construction of the hand truck of the present invention allows the hand truck to be serviceable under a variety of conditions. The inventive hand truck uses a simple and durable mechanism, thereby reducing the frequency of repairs and accordingly reducing the length of time necessary to effectuate repairs once a mechanical problem develops.

SUMMARY OF THE INVENTION

Briefly stated, the present invention is a hand truck having a folding nose piece. This hand truck includes a frame having a pair of wheels. A nose piece is rotatably attached to the frame and is rotatable between a first position, generally perpendicularly extended from the frame, and a second position, generally parallel to the frame. A lever is pivotally connected to the frame to move between a locked position and an open position. The lever engages and maintains the nose piece in the first position when the lever is in the locked position. The lever engages and maintains the nose piece in the second position when the lever is in the locked position. The nose piece is movable between the first position and the second position when the lever is in the open position.

BRIEF DESCRIPTION OF THE DRAWINGS

The foregoing summary, as well as the following detailed description of the presently preferred embodiment of the invention will be better understood when read in conjunction with appended drawings. For the purpose of illustrating the invention, there is shown in the drawings, an embodiment which is presently preferred. It should be understood, however, that the present invention is not limited to the particular arrangement and instrumentality shown. In the drawings.

DETAILED DESCRIPTION OF THE INVENTION

Figure 1:
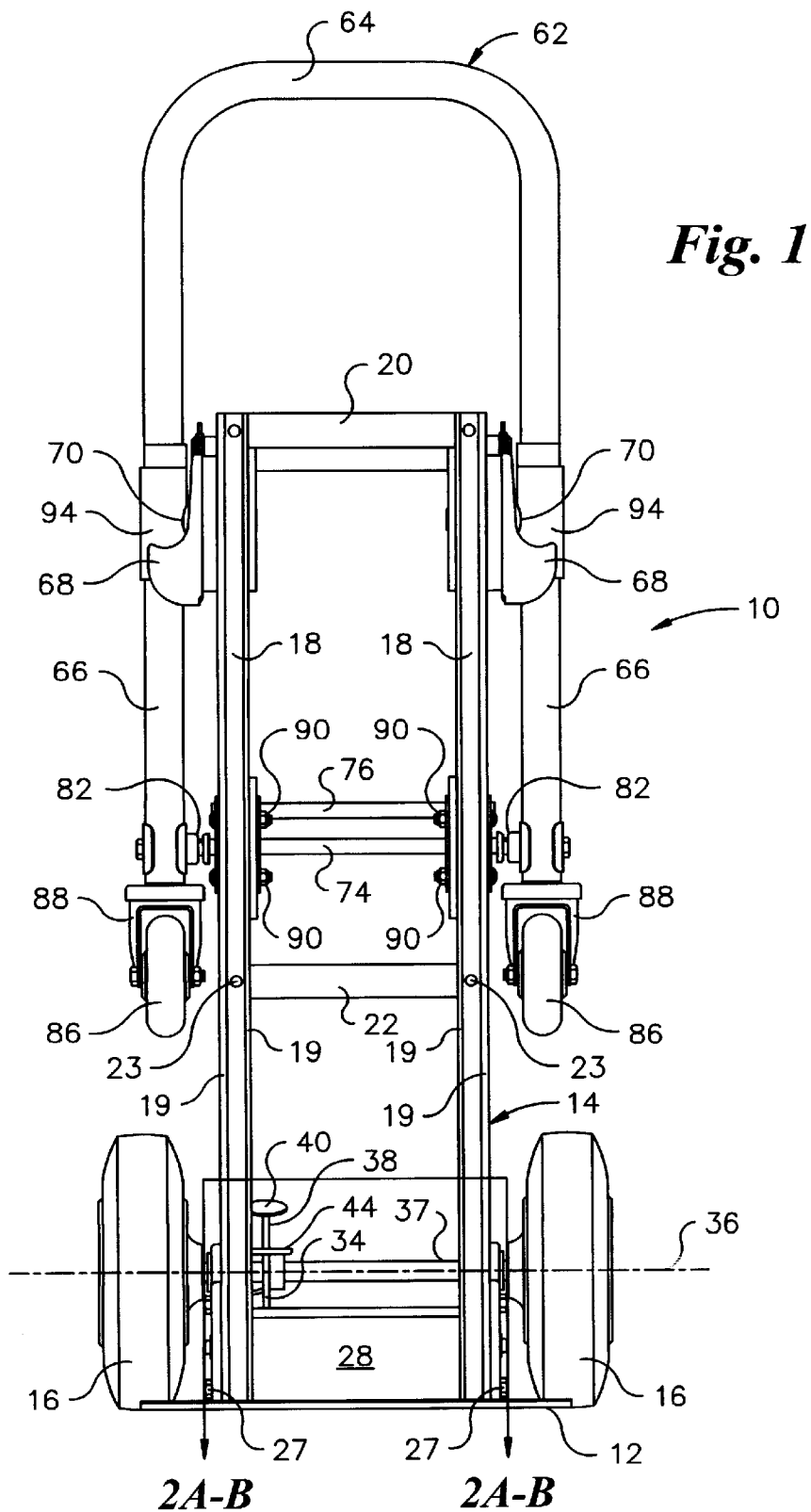
FIG. 1 is an elevational front view of a hand truck in accordance with the present invention.

Certain terminology is used in the following description for convenience only and is not limiting. The words "right," "left," "lower," and "upper" designate directions in the drawings to which reference is made. The words "inwardly" and "outwardly" refer to directions toward and away from, respectively, the geometric center of the hand truck and designated parts thereof. The terminology includes the words above specifically mentioned, derivatives thereof and words of similar import.

Referring to the drawings in detail, wherein like numerals indicate like elements throughout, there is shown in FIGS. 1–8 a preferred embodiment of a hand truck 10 having a folding nose piece 12. As shown in FIGS. 1 and 5–8, the hand truck 10 has a frame 14 and a pair of wheels 16. In FIG. 1 the pair of wheels 16 are shown in the lower left and right corners of the drawing. As shown in FIG. 1, the preferred embodiment of the present invention is formed with frame 14 being constructed using two vertical struts 18 that are joined by a first cross bar 20 at the upper end of the two vertical struts 18. A second cross bar 22 also connects the two vertical struts 18 at a point slightly below the midpoint of the two vertical struts 18. In the preferred embodiment, the first and second cross bars 20, 22 are formed using rectangular tubing. The first and second cross bars 20, 2 can also be formed using round tubing, polygonal tubing, or simple plates or strips of material. While in the preferred embodiment there are first and second cross bars 20, 22 between the vertical struts 18, it is understood by those of ordinary skill in the art from this disclosure that the present invention is not limited to any particular number of cross bars. For instance, three or four equally spaced cross bars can be used to connect the two vertical struts 18.

Figure 3:
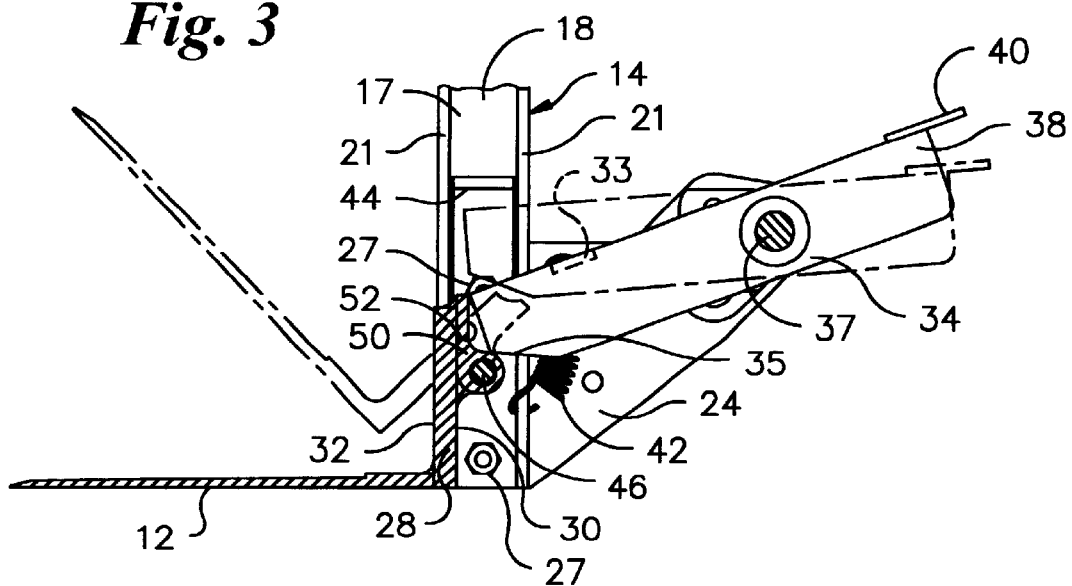
FIG. 3 is a greatly enlarged partial cross-sectional view of the hand truck shown in FIG. 2A taken along line 3—3 of FIG. 2A.
Figure 4:
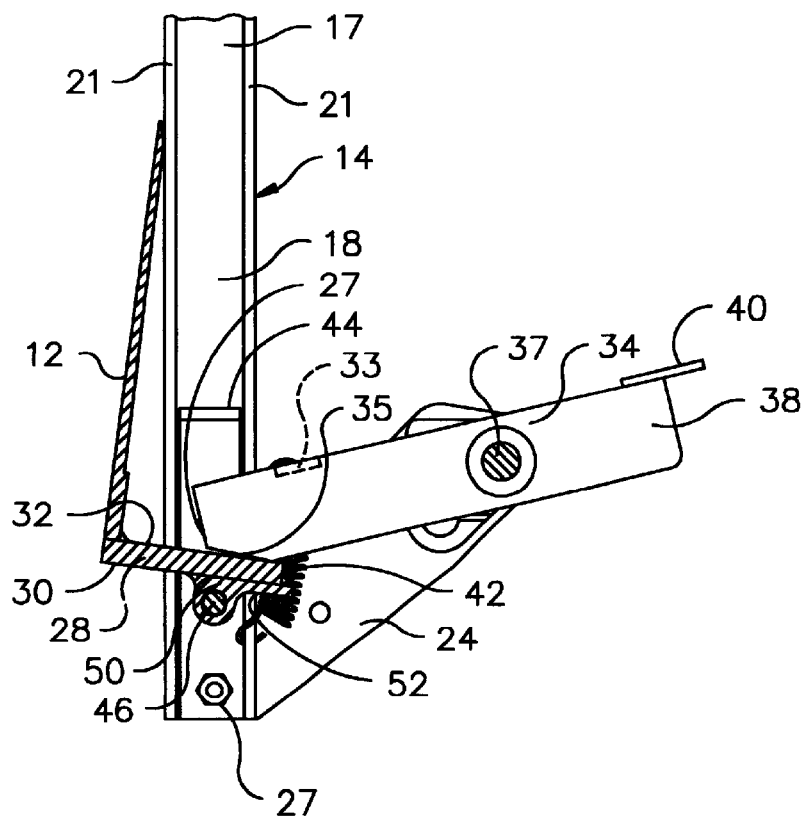
FIG. 4 is a greatly enlarged partial cross-sectional view of the hand truck shown in FIG. 2B taken along line 4—4 of FIG. 2B.
Figure 5:
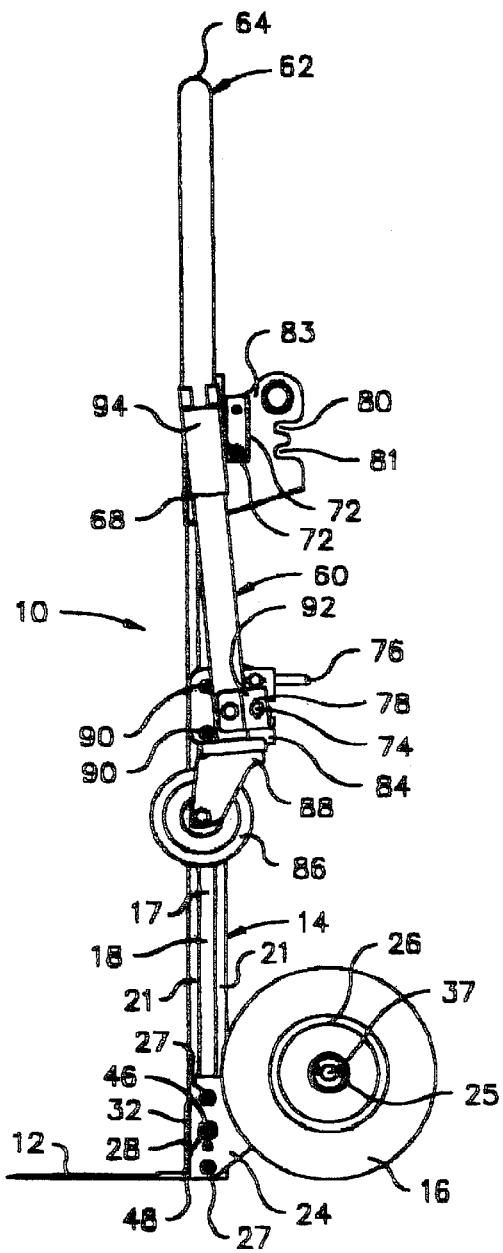
FIG. 5 is a right side elevational view of the hand truck of FIG. 1.
Figure 6:
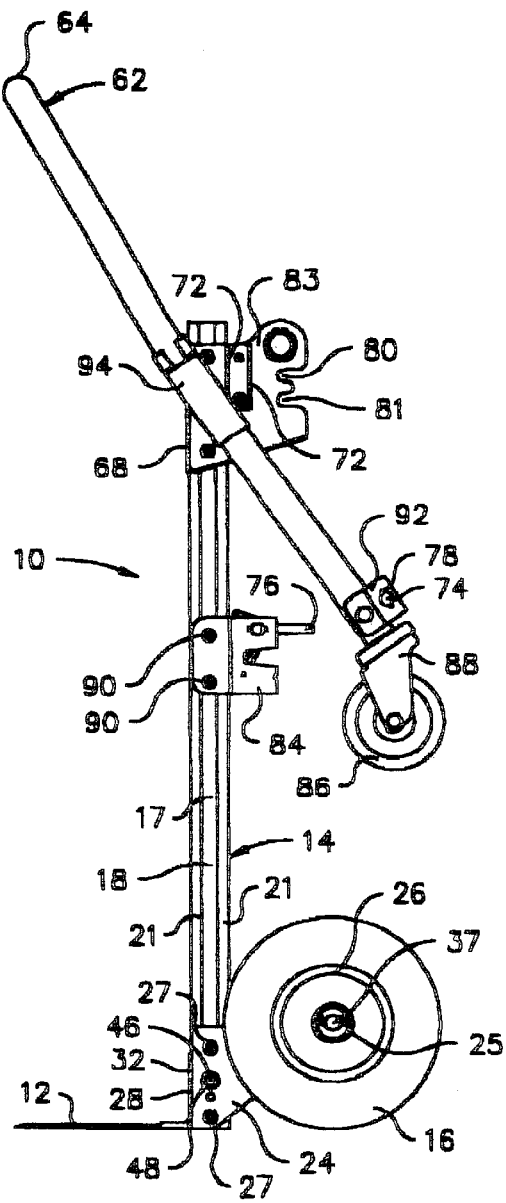
FIG. 6 is a right side elevational view of the hand truck of FIG. 1 just starting the process of being converted to a cart.

As shown in FIG. 1, each vertical strut 18 has a raised portion 19 along the left and right edges on the front side and on the rear side (not shown). These raised portions 19 result from the type of beam (i.e., an I beam) used to form the vertical strut 18. In addition, as shown in FIGS. 3, 4, and 5, each vertical strut 18 has a channel 17 with a flange section 21 on both the left and right sides of the channel 17. While this configuration is due to the particular beams chosen to construct the vertical struts 18 of the preferred embodiment, it is understood by those of skill in the art through this disclosure that the present invention is not limited to the type of beams shown in the drawings to construct the vertical struts 18. For instance, different types of I beams, T beams, rectangular tubing, and circular tubing can also be used to form the vertical struts 18. As shown in FIG. 1, in the preferred embodiment of the present invention, the first cross bar 20 and the second cross bar 22 are secured using bolts 23, that are fastened to each of the left and right sides of the first and second cross bars 20, 22, to the vertical struts 18. Thus secured, the first and second cross bars 20, 22 allow the frame 14 to support one side of an object (not shown) that is carried on the hand truck 10. Unless otherwise stated herein, the non-fastening elements of the frame 14 are constructed of a high strength, light weight material, such as aluminum. However, it is understood by those of ordinary skill in the art from this disclosure that other materials, such as steel, stainless steel, or high density plastic, could be used without departing from the spirit and the scope of the invention.

The wheels 16 are located on the lower end of the frame 14, on the right and left sides of the frame 14, and are used to bear the weight of items that are carried using the hand truck 10. The wheels 16 are constructed in a conventional manner as is well understood by those of skill in the art. As shown in FIG. 5, each of the wheels 16 is rotatably attached to a flange 24 which extends rearwardly from the outer side of the vertical struts 18. The wheels 16 are attached to an end of an axle 37 using a cotter pin 25. As shown in FIG. 5, the wheels 16 are mounted on a rim 26. In the preferred embodiment of the present invention, the rims 26 are formed using a material that is highly corrosive resistant, strong, and durable, such as aluminum. The use of the flanges 24 to support the wheels 16 allows the nose piece 12 to have a wider width than would be possible if the pair of wheels 16 were attached at the lower end of the frame 14. Of course, if the pair of wheels 16 were mounted on the lower end of the frame 14 without using the flanges 24, then the nose piece 12 would have a shorter width, as measured from the lower left side to the lower right side in FIG. 2A, without effecting the proper operation of the present invention.

In the preferred embodiment of the present invention, each flange 24 is generally in the form of a semi-trapezoid. However, the particular dimensions, or shape, of the flanges 24 is not crucial to the present invention. In the preferred embodiment of the present invention, the flanges 24 are attached to the outside of the vertical struts 18 at the lower end of the vertical struts 18 using standard fasteners, such as bolts 27. Alternatively, many different fastening means can be used to attach the flanges 24 to the vertical struts 18, such as welds or rivets. While in the preferred embodiment of the present invention the flanges 24 are attached to the bottom end of the vertical struts 18, the flanges 24 can be placed higher up along the vertical struts 18 than the positioning shown in FIGS. 1 and 5 depending on the size of the wheels 16 used with the frame 14.

As shown in FIGS. 2A–4, the nose piece 12 is rotatable between a first position, generally perpendicularly extending from the frame 14, and a second position, generally parallel to the frame 14. The nose piece 12 is shown in the first position in FIGS. 1, 2A, 3, and 5–8. The first position is ideal for transporting heavy loads using the hand truck 10. While in the preferred embodiment of the present invention the nose piece 12, while in the first position, forms a substantially perpendicular angle with the frame 14, the specific angle between the nose piece 12 and the frame 14, while the nose piece 12 is in the first position, can be varied depending on the application for which the hand truck 10 is being designed. The nose piece 12 is shown in the second position in FIGS. 2B and 4. Placing the nose piece 12 in the second position is ideal for storing the hand truck 10 in a restricted space, such as in the trunk of a car. In addition, placing the nose piece 12 in the second position simplifies the storing of multiple hand trucks 10 in an industrial setting.

In the preferred embodiment, the nose piece 12, the support plate 28, and the hub plate 50 are integrally formed using an aluminum extrusion process. However, those of skill in the art will understand from this disclosure that the nose piece 12, the support plate 28, and the hub plate 50 can be integrally formed by an injection molding process or a casting process. Additionally, the nose piece 12, the support plate 28, and the hub plate 50 can be individually manufactured. For example, the support plate 28 and the hub plate 50 be welded together and then attached along a rear edge of the nose piece 12 using an additional weld. Alternatively, combinations of L-shaped connectors and fasteners can also be used to attach the nose piece 12, the support plate 28, and the hub plate 50 together. As shown in FIGS. 3 and 4, the hub plate 50 is rotatably attached to the lower end of the vertical struts 18 of the frame 14. As shown in FIGS. 2A–4, the hub plate 50 encloses a nose piece axle 46. In the preferred embodiment of the present invention, the nose piece axle 46 is secured to the lower end of the vertical struts 18 using bolts 48. Alternatively, any acceptable fastener that is capable of securing the nose piece axle 46 between the two vertical members 18 may be used. Thus, the hub plate 50 allows the nose piece 12 and the support plate 28 to rotate with respect to the vertical struts 18 of the frame 14. Alternatively, the nose piece 12, support plate 28, and the hub plate 50 can be formed as an integral whole using a molding or casting method. The hub plate 50 has a rear side 52 that faces the frame 14 while the nose piece 12 is in the first position, as shown in FIG. 3. The support plate 28 has a front side 32, opposite from the rear side 30, that supports the hub plate 50.

The term "support plate", as used herein should be interpreted to mean a component that comprises both the "support plate 28" and the "hub plate 50" as shown in the drawings. While in the preferred embodiment the claimed "support plate" is being formed by joining two separate components, namely the "support plate 28" and the "hub plate 50" that are shown in the drawings, it is understood by those of ordinary skill in the art from this disclosure that the present invention is not limited to the manner of forming the "support plate". For instance, as mentioned above, the claimed "support plate" can be constructed using two separate pieces that are joined together or the "support plate" can be formed of a single molded component that is the equivalent of both the above detailed "support plate 28" and the "hub plate 50."

Figure 2A:
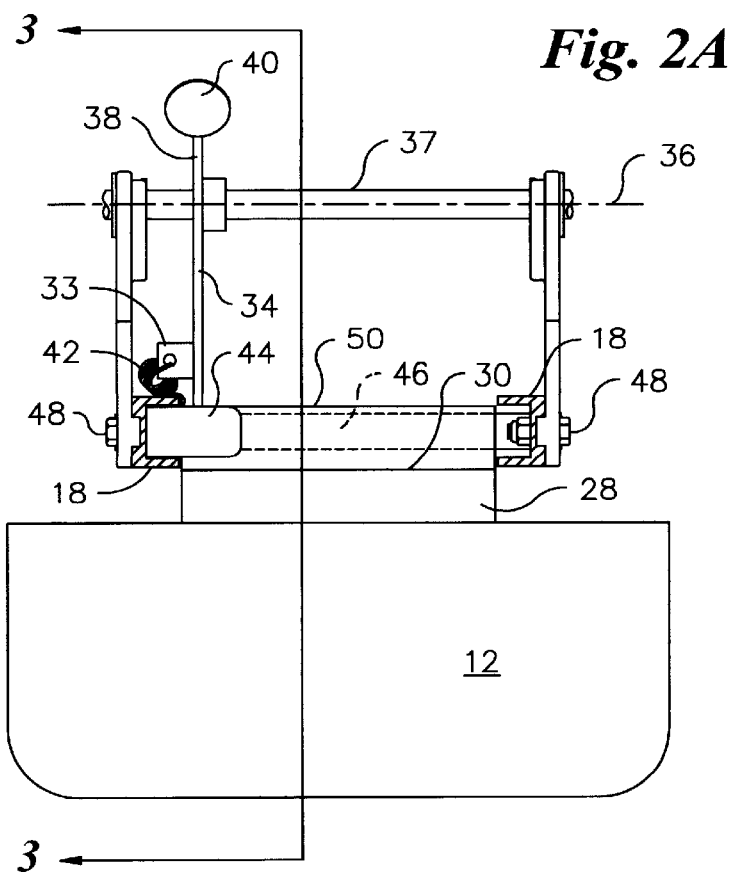
FIG. 2A is an enlarged cross-sectional view of the hand truck shown in FIG. 1 taken along line 2A–B—2A–B of FIG. 1 with the folding nose piece in the use position.
Figure 2B:
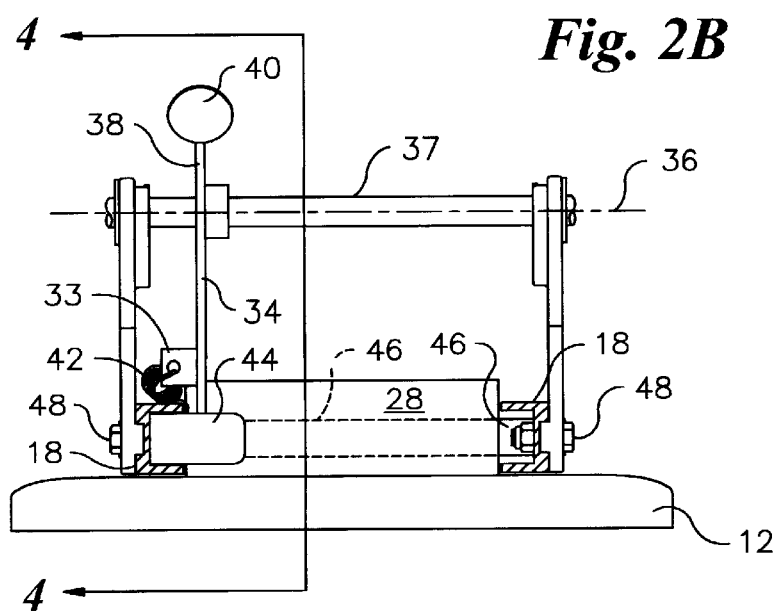
FIG. 2B is an enlarged cross-sectional view of the hand truck shown in FIG. 1 taken along line 2A–B—2A–B of FIG. 1 with the folding nose piece in the storage position.

As shown in FIGS. 1–4, a lever 34 is pivotally connected to the frame 14 and moves between a locked position (shown in solid lines in FIGS. 3 and 4) and an open position (shown in phantom in FIG. 3). When the lever 34 is in the locked position, the nose piece 12 is not able to rotate between the first position and the second position. When the lever 34 is in the open position, the nose piece 12 can be rotated back and forth between the first position and the second position. Referring to FIGS. 1–2B, in the preferred embodiment of the present invention the lever 34 is pivotally mounted about an axle 37 which is co-axial with an axis of rotation 36 of the pair of wheels 16. While mounting the lever 34 about the axle 37 simplifies the construction of the hand truck 10, it is not necessary to mount the lever 34 about the axle 37. Nor is it necessary that the positioning of the lever 34 cause the lever 34 to rotate about an axis of rotation 36 that is common to the wheels 16. Using modifications known to those of skill in the art from this disclosure, the lever 34 can be mounted at numerous positions that would be suitable to implement the present invention. For example, it is possible to mount the lever 34 directly to a cross bar 20,22 of the frame 14.

As shown in FIGS. 1, 2A, and 3, the lever 34 engages the rear side 52 of the hub plate 50 and maintains the nose piece 12 in the first position when the lever 34 is in the locked position. When the lever 34 abuttingly contacts the rear side 52 of the hub plate 50, the nose piece 12 is fixed in the first position and the hand truck 10 can be used without any concerns of the nose piece 12 accidentally rotating and causing an accident. While the present preferred embodiment of the hub plate 50 presents a smooth rear surface 52, a groove (not shown) in the rear side 30 of the support plate 28 may be used to facilitate the engagement of the hub plate 50 with the lever 34. Similar minor modifications, such as the texturing of the rear surface 52, would be well known to those of skill in the art when taken in combination with the present disclosure. While the preferred embodiment of the lever 34, as shown in FIGS. 2A–4, is to use a semi-rectangular plate having a corner 35 designed to complementarily engage the hub plate 50 (see the lower left hand corner of lever 34 in FIG. 3), it is understood by those of ordinary skill in the art from this disclosure that the present invention is not limited to any particular shape or positioning of the lever 34. For instance, many other shapes and configurations, such as a circular tube shape or a square tube shape would be suitable to implement the present invention. It is not necessary that the lever 34 be constructed of the same type of material as the hand truck 10.

As shown in FIGS. 2B and 4, the lever 34 also engages and maintains the nose piece 12 in the second position when the lever 34 is in the locked position. The front side 32 of the support plate 28 is engaged by the corner 35 of the lever 34 while the nose piece 12 is in the second position and the lever 34 is in the locked position. When the nose piece 12 is in the second position, the hand truck 10 is easy to store or transport in a tightly packed moving van. The use of the lever 34 to abuttingly engage the front side 32 of support plate 28 prevents the accidental rotation of the nose piece 12. Simple modifications, such as the inclusion of ridges or grooves along the interface between the lever 34 and the front side 32 of the support plate 28 can be effectuated to alter the coefficient of friction between the support plate 28 and the lever 34. While in the preferred embodiment the nose piece 12 and the support plate 28 are at a substantially perpendicular angle relative to each other, it is understood by those of skill in the art through this disclosure that the present invention is not limited to any particular angular orientation between the nose piece 12 and the support plate 28. For instance, it is not necessary, and in some applications may be less desirable, to use the perpendicular orientation. Instead, an angle of about 80 degrees between the nose piece 12 and the support plate 28 may be found to be ideal for the transportation of specific objects (not shown).

The nose piece 12 is movable between the first position, as shown in FIG. 3, and the second position, as shown in FIG. 4, when the lever 34 is in the open position. The lever 34 is shown in the open position using phantom lines in FIG. 3. As shown in FIGS. 1–4, the lever 34 has an end 38 that is depressed in the downward direction, as viewed in FIGS. 2A and 2B, to move the lever 34 into the open position. Moving the lever 34 into the open position disengages the corner 35 of the lever 34 from either one of the support plate 28 and the hub plate 50 thereby allowing the nose piece 12 to be pivoted between the first position and the second position. A stop plate 44 is preferably attached to one of the vertical struts 18 and extends generally perpendicularly from the respective strut 18 to limit the vertical movement of the lever 34. When the pedal 40 of the lever 34 is depressed, the end of the lever 34 that contacts the nose piece 12 is rotated generally upwardly. The upward movement of the lever 34 is limited by contact with the stop plate 44. While in the present embodiment a pedal 40 is attached to the end 38 of the lever 34 to facilitate depressing the end 38 of the lever 34 to move the lever 34 into the open position, it is understood by those of ordinary skill in the art through this disclosure that the present invention is not limited to any particular device or method of moving the lever 34 between the locked position and the open position. For instance, a small electric motor or solenoid (not shown) could be used to allow a user to conveniently operate the hand truck 10 while easily switching the lever 34 between a locked position and an open position. This would be especially useful in situations that require the frequent moving of the nose piece 12 between the first position and the second position. Alternatively, a rope and pulley system (not shown) could also be used as a method of manipulating the lever 34. This would allow a user to disengage the lever 34 by pulling on an end of a cord that is secured near the upper end of the frame 14. The rope and pulley system could also incorporate a small motor that is also mounted on the upper end of the frame 14 to exert force on the rope without the user having to completely release one hand from the hand truck 10.

As shown in FIGS. 2A–4, an elastic member 42 causes the lever 34 to be biased toward the locked position. It is the elastic member 42 that causes the lever 34 to maintain the position of the nose plate 12, whether the nose plate 12 is in either the first position or the second position, once the end 38 of the lever 34 is no longer depressed. The elastic member 42 is attached to a side plate 33 that is attached to the left side of the lever 34, as viewed in FIG. 2A, proximate to the end of the lever 34 that engages either one of the support plate 28 and the hub plate 50. The elastic member 42 is also secured to a lower end of the left vertical strut 18, as shown in FIGS. 3 and 4. While it is not shown in the drawings, the elastic member 42 is connected to the left vertical strut 18 through a hole (not shown). As can be inferred from FIGS. 3 and 4, the hole is positioned in the lower portion of the flange section 21 of the left vertical strut 18. While in the preferred embodiment the side plate 33 is attached to the lever 34 using a weld, it is understood by those of ordinary skill in the art from this disclosure that the present invention is not limited to any particular method or device for connecting the elastic member 42 between the lever 34 and the frame 14. For instance, the elastic member 42 could be attached directly to the lever via an opening in the body of the lever 34 itself. In the preferred embodiment the elastic member 42 is an industrial coil spring, however, it is understood by those of ordinary skill in the through this disclosure that the present invention is not limited by the type of elastic member 42 used to bias the lever 34 into the locked position. For instance, torsional springs (not shown), that are mounted about the same axis as the lever 34, would also be effective. The important aspect of the elastic member 42 is simply that the elastic member 42 bias the lever 34 into engagement with either the support plate 28 or the hub plate 50.

Figure 7:
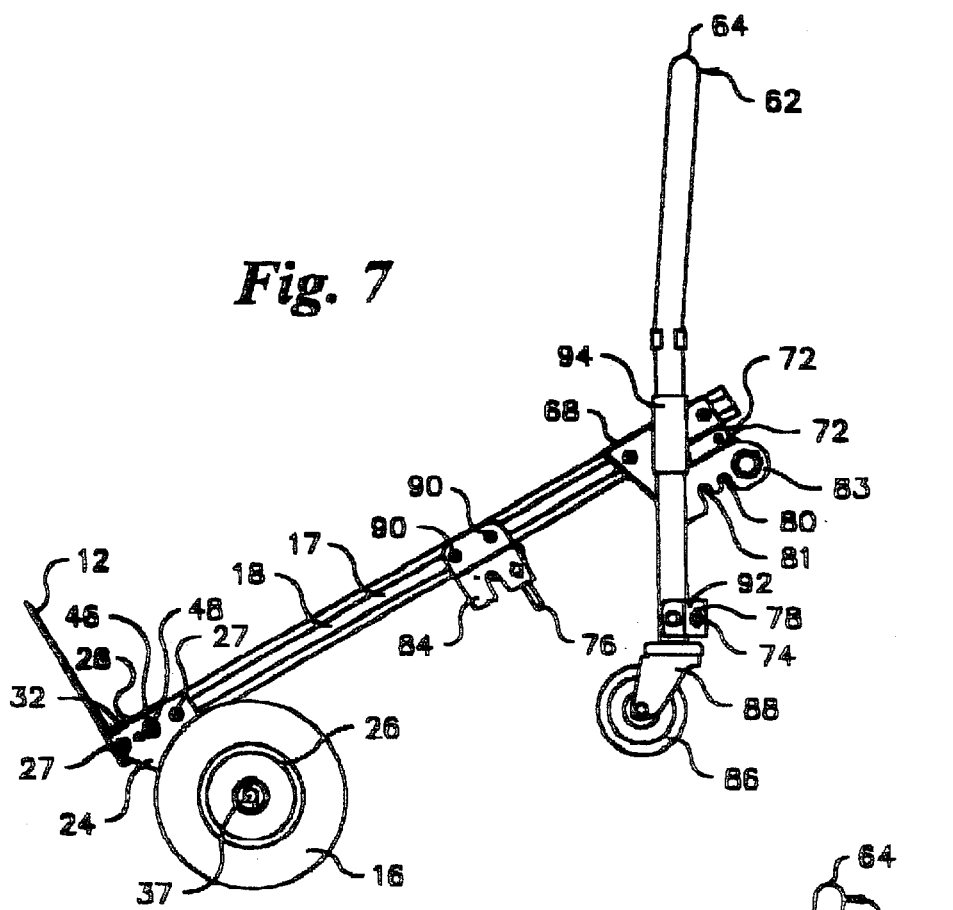
FIG. 7 is a right side elevational view of the hand truck of FIG. 1 in the process of being converted from a configuration for use as a hand truck to a configuration for use as a cart.
Figure 8:
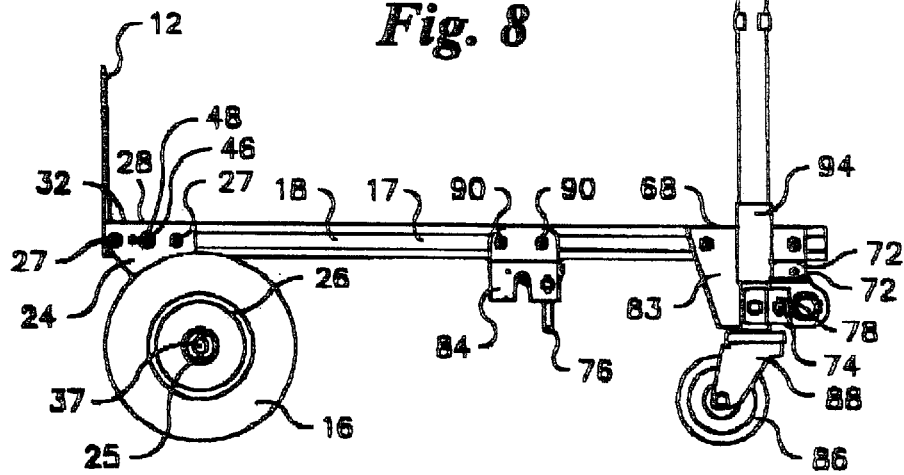
FIG. 8 is a right side elevational view of the hand truck of FIG. 1 converted into a configuration for use as a cart.

Referring now to FIGS. 1 and 5–8, the upper structure, generally designated 60, allows the hand truck 10 to be converted into a four wheel cart (shown in FIG. 8). However, it is understood by those of ordinary skill in the art that the present invention is not limited to hand trucks that are convertible to carts. For instance, the present invention can be used as a simple home hand truck, an industrial strength hand truck, a hand truck with straps attached, a hand truck with special devices for facilitating the movement of the hand truck up and down stairs and embankments, a hand truck with rotating cranks, a hand truck with attached cinching devices or motors, and with hand trucks built to move specific sized objects (none of which are shown).

The upper structure 60 has a U-shaped member 62 which includes a handle portion 64 and two leg portions 66. FIG. 1 shows the U-shaped member 62 locked in the hand truck position. While the U-shaped member 62 is locked in a hand truck position, the hand truck 10 is usable as a typical hand truck. Referring to FIG. 1, the U-shaped member 62 is rotatable about a partial axle 70. One partial axle 70 is located on each of the left and right sides of the upper portion of the vertical struts 18. As viewed in FIGS. 5 and 6, the U-shaped member 62 is rotatable in a counter clockwise direction to place the U-shaped member 62 in a position generally perpendicular to that of the frame 14 (as shown in FIG. 8). Once the U-shaped member 62 is generally perpendicular to the frame 14, the U-shaped member slides to the left, as viewed in FIGS. 5 and 6, until the cart axle 74 engages axle securing groove 80. Once the cart axle 74 is engaged with the axle securing groove 80, the U-shaped member 62 is in a cart position. Once the U-shaped member is in a cart position, the hand truck 10 is positioned with the vertical struts 18 being generally parallel to the ground to facilitate the carrying of items (not shown).

When the U-shaped member 62 is in the hand truck position, as shown in FIGS. 1 and 5, the leg portions 66 abut a hand truck stop plate 68. One hand truck stop plate 68 is located on both the left and right upper corners of the frame 14. While in the preferred embodiment the hand truck stop plates 68 are connected to the vertical struts 18 using bolts (not shown), it is understood by those of ordinary skill in the art from this disclosure that the present invention is not limited to any particular method of attaching the hand truck stop plate 68 to the vertical struts 18. As mentioned above, the leg portions 66 rotate about the partial axles 70. One partial axle 70 is located proximate to each hand truck stop plate 68 in a vertical strut 18. One upper flange 83 is located on the outside of each of the vertical struts 18. As shown in FIGS. 5–8, cart stop plates 72 are located on the outside of each upper flange 83. The cart stop plates 72 prevent the U-shaped member 62 rotating counter clockwise past the point where the U-shaped member 62 is perpendicular with the frame 14.

Once the U-shaped member 62 is in the hand truck position, the cart axle 74 is locked in place by a cam locking device 84. The cam locking device 84 is shown in profile in FIGS. 5–8. The actual workings of the cam locking device 84 is not shown in the above figures and are not pertinent to the present invention. To release the cart axle 74 from the cam locking device 84, the cam lock release 76 is rotated. Once the cam lock release 76 is rotated clockwise, as viewed from FIG. 5, the cam locking device 84 releases the cart axle 74 and the U-shaped member 62 is free to rotate counter clockwise, as viewed in FIG. 5. The cart axle 74 is secured to the U-shaped member 62 using a pair of side plates 92. The cart axle 74 is inserted through each of the side plates 92 and is secured by a pin 78. As shown in FIG. 1, the lower end of each of each leg portions 66 has a catch 82 attached to an inwardly facing side of the leg portion 66. The catch 82 is knob shaped and has a circumferential groove that allows the catch 82 to engage the catch securing groove 81 in the upper flange 83.

After releasing the U-shaped member 62 from the hand truck position and rotating the U-shaped member 62 into a position perpendicular with the frame 14, the U-shaped member 62 can slide through collars 94 to allow the wheels 86, that are located at the ends of the leg portions 66, to be brought towards the frame 14. As the wheels 86 are brought towards the frame 14 (as shown in FIG. 7), cart axle 74 engages the axle securing groove 80 in the flange 83. At the same time, catch 82 on each of the leg portions 66 engages a catch securing groove 81 in the upper flange 83. Once both the catches 82 and the cart axle 74 have engaged the upper flange 83, the hand truck 10 will remain stably in the cart position as long as all four wheels are in contact with the ground, as shown in FIG. 8. Each of the wheels 86 is attached to the lower end of a leg portion 66 using a rotating mount 88.

To convert the hand truck 10 from the cart position (shown in FIG. 8) back to the hand truck position (shown in FIG. 5), the hand truck is positioned so that the frame 14 is generally perpendicular to the ground and the pair of wheels 16 on the lower end of the frame 14 are in contact with the ground. This places the hand truck 10 in a position similar to that shown in FIG. 5. Then, the U-shaped member 62 is slid through the collars 94 (to the right as viewed in FIG. 5) to disengage the cart axle 74 and the catch 82 from the axle securing groove 80 and the catch securing groove 81, respectively. Afterwards, the U-shaped member 62 can be rotated into a position substantially parallel with the frame 14 and the cart axle 74 can be secured by the cam locking device 84. Thus converted, the convertible hand truck 10 is now configured to operate as a normal hand truck.

Referring now to FIGS. 1–8, in operation, the hand truck 10 with the foldable nose piece 12 can be easily stored and then easily transformed into its operable form for the transportation of heavy or unwieldy objects. While the nose piece 12 is in the second position, the hand truck 10 can be easily stored in a closet, a car trunk, or in the back of a moving van. Once one desires to move a heavy object, the hand truck 10 is removed from storage and placed on a flat surface. Then, while stabilizing frame 14, lever 34 is depressed by applying pressure, using either a foot or a hand, to the pedal 40. As pressure is applied to the pedal 40 of the lever 34, the lever 34 rotates about axis 36 disengaging the lever 34 from the support plate 28. Once the lever 34 is disengaged from the front side 32 of the support plate 28, the nose piece 12 is freely rotatable into the first position. Once the nose plate 12 is in the first, or extended, position, pressure is removed from the pedal 40 of the lever 34 and the lever 34 engages the rear side 52 of the hub plate 50. Once the lever 34 is engaged with the rear side 52 of the hub plate 50, the nose piece 12 is fixed in the first position and the hand truck 10 is ready to aid in the transportation of heavy or unwieldy objects.

Once one is finished transporting objects using the hand truck 10, the pedal 40 of the lever 34 is again depressed. The depressing of the pedal 34 causes the corner 35 of lever 34 to disengage from the rear side 52 of hub plate 50. Then, nose piece 12 is then rotated into the second position, where the nose piece 12 is parallel to the frame 14. Once the nose piece 12 is in the second position, the pedal 40 is released and the lever 34 secures the nose piece 12 into position. The lever 34 secures the nose piece 12 into the second position by engaging the front side 32 of support plate 28 with the corner 35 of the lever 34. As is clear from the foregoing details, this efficient design of a hand truck is both highly versatile and economical to manufacture. Thus, allowing a manufacturer to produce superior hand trucks at a reduced cost and thereby provide lower cost hand trucks to consumers.

From the foregoing description, it can be seen that the present invention comprises a hand truck having a folding nose piece that facilitates both the use and storage of the hand truck. It will be appreciated by those skilled in the art that many changes and modifications may be made to the above-described embodiment without departing from the inventive concept thereof. It is understood, therefore, that the present invention is not limited to the particular embodiment disclosed, but it is intended to include all modifications and changes which are within the scope and spirit of the invention as defined by the appended claims.

I claim the following:

1. A hand truck having a folding nose piece, comprising:
 a frame having a pair of wheels;
 a nose piece rotatably attached to said frame and rotatable between a first position, generally perpendicularly extended from said frame, and a second position, generally parallel to said frame, said nose piece having a support plate attached along an edge of said nose piece, said support plate having a front side facing said nose piece and a rear side extending substantially parallel to said frame when said support plate is in said first position; and
 a lever pivotally connected to said frame to move between a locked position and an open position, said lever engaging and maintaining said nose piece in said first position when said lever is in said locked position, said lever engaging and maintaining said nose piece in said second position when said lever is in said locked position, said nose piece being movable between said first position and said second position when said lever is in said open position, wherein said lever engages said rear side of said support plate while said nose piece is in said first position and said lever is in said locked position and said lever engages said front side of said support plate while said nose piece is in said second position and said lever is in said locked position.

2. The hand truck of claim 1, further comprising an elastic member biasing said lever toward said locked position.

3. The hand truck of claim 2, wherein said lever has an end that is depressed to move said lever to said open position disengaging said lever from said support plate thereby allowing said nose piece to pivot between said first position and said second position.

4. The hand truck of claim 1, wherein said lever is pivotally mounted about an axis which is coaxial with an axis of rotation of said pair of wheels.

* * * * *